(No Model.)
S. E. FOREMAN & F. T. WALLS.
CHURN.
No. 348,002. Patented Aug. 24, 1886.
Fig. 1
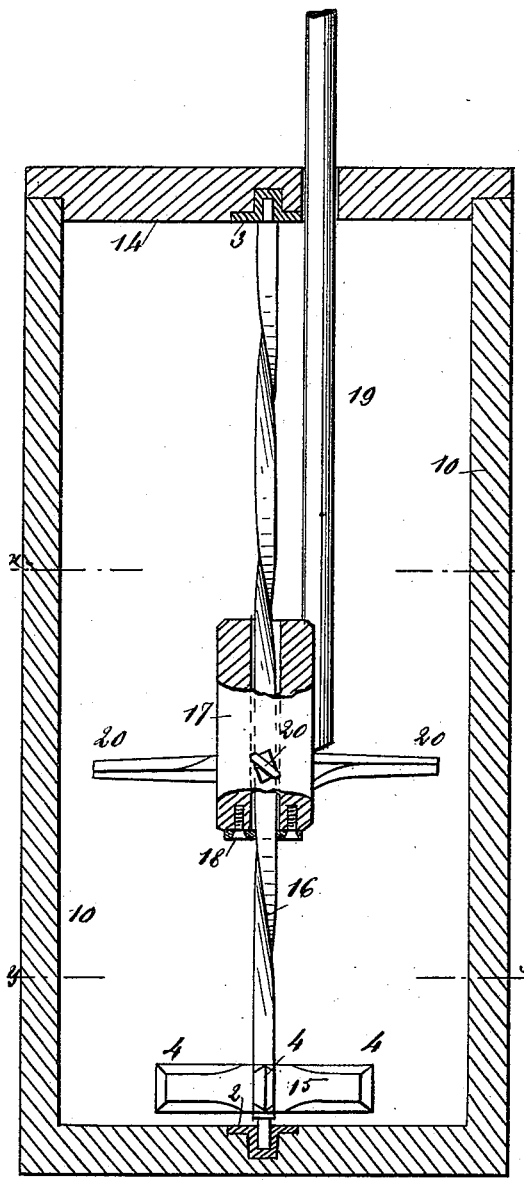
Fig. 2
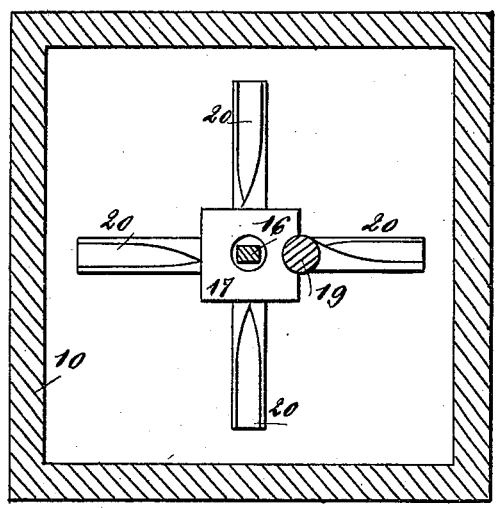
Fig. 3
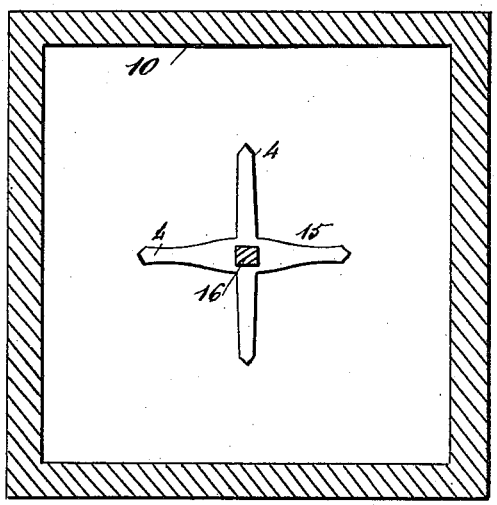
Fig. 4  Fig. 5
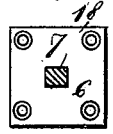
Fig. 6
WITNESSES:
C. Neveux
C. Sedgwick
INVENTOR:
S. E. Foreman
F. T. Walls
BY Munn & Co
ATTORNEYS.

UNITED STATES PATENT OFFICE.

SAMUEL E. FOREMAN AND FRANK T. WALLS, OF RANDOLPH, KANSAS.

CHURN.

SPECIFICATION forming part of Letters Patent No. 348,002, dated August 24, 1886.

Application filed June 22, 1886. Serial No. 205,900. (No model.)

*To all whom it may concern:*

Be it known that we, SAMUEL E. FOREMAN and FRANK T. WALLS, of Randolph, in the county of Riley and State of Kansas, have invented a new and Improved Churn, of which the following is a full, clear, and exact description.

The object of our invention is to provide a churn wherein the cream will be agitated during the process of churning by currents produced in four directions, which objects we accomplish by imparting a rotary motion, first in one direction then in the other, to the main dasher, while a reciprocating motion is imparted to a block which carries dasher-blades.

Reference is to be had to the accompanying drawings, forming a part of this specification, in which similar figures of reference indicate corresponding parts in all the figures.

Figure 1 is a view of our improved churn, wherein the churn body or barrel and the cover thereof are shown in section, and wherein the plunger-block is broken away to disclose its construction. Fig. 2 is a sectional view taken on line $x\ x$ of Fig. 1. Fig. 3 is a sectional view taken on line $y\ y$ of Fig. 1. Fig. 4 is a detail view illustrating the construction of the metallic plate carried by the plunger. Fig. 5 is a view of a modified form of shaft, and Fig. 6 is a detail view of the blade or socket arranged for use in connection with such a shaft as is shown in Fig. 5.

In the drawings above referred to, 10 represents the body or barrel of the churn, which may be square, round, or any other form desired. In the bottom 12 of the body or barrel 10 there is a metallic step or socket, 2, and in the cover 14 there is a metallic socket, 3.

The dasher proper, which is shown at 15, consists of any required number of radial extending blades, 4 4, that are fixed to the lower end of a vertical shaft, 16, which shaft 16 is preferably rectangular in cross-section, but formed with a twist from end to end, as clearly shown in Fig. 1. Upon the shaft 16 there is arranged a centrally-apertured block, 17, to the lower end of which there is secured a metallic plate, 18, formed with an aperture, 7, through which the shaft 16 passes. The block 17 is provided with a stem or handle, 19, which extends upward through the cover 14 to within reach of the operator, and, in addition to the handle or stem, the block carries a number of dasher-blades, 20, formed with inclined faces, as indicated.

From the construction described it will be seen that as a reciprocating motion is imparted to the block 17, through the medium of its handle 19, the shaft 16, and with it the blades of the dasher 15, will be rapidly rotated, the direction of rotation changing with the direction of the movements of the block, so that the cream or milk contained within the churn is forced violently downward and to one side while the plunger is being depressed; but as the plunger is elevated its tendency is to raise the cream or milk, which at the same time will be thrown in an opposite direction by the dasher 15.

Instead of using a solid shaft—such as the one shown in Figs. 1, 2, 3, and 4—we can use a shaft such as the one illustrated in Figs. 5 and 6, wherein the shaft is made up of two stout wires or rods that are twisted together, and in this case the blade 18 would be apertured, as illustrated in Fig. 6.

From the peculiarly rapid and varying movements imparted to the cream by the mechanism above described, this churn will be found to work rapidly, and at the same time thoroughly, and as the construction is extremely simple it may be applied to most any form of churn-barrel.

Having thus fully described our invention, what we claim as new, and desire to secure by Letters Patent, is—

1. The combination, with a churn-body, of a twisted vertical shaft, a dasher carried by said shaft, a block carrying an apertured plate through which the shaft passes, dasher-blades carried by the block, and a handle extending upward through the cover of the churn, substantially as described.

2. The combination, with a churn-body, of a twisted shaft stepped in sockets 2 and 3, a centrally-apertured block carrying an apertured plate through which the said shaft passes, dasher arms or blades carried by the block, a handle extending upward through the cover of the churn, and a main dasher carried by the vertical shaft, substantially as described.

SAMUEL E. FOREMAN.
FRANK T. WALLS.

Witnesses:
G. W. KIMBALL,
M. FOREMAN.